United States Patent
Smith et al.

(10) Patent No.: US 10,960,828 B2
(45) Date of Patent: Mar. 30, 2021

(54) REAR SEAT ENTERTAINMENT BRACKET WITH SWIVEL BALL POSITIONING

(71) Applicant: GM Global Technology Operations LLC, Detroit, MI (US)

(72) Inventors: Stephen L. Smith, Chesterfield, MI (US); Wendy Zaranek, Macomb, MI (US); Bryan R. Wakely, Washington Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 66 days.

(21) Appl. No.: 16/181,973

(22) Filed: Nov. 6, 2018

(65) Prior Publication Data

US 2020/0139896 A1     May 7, 2020

(51) Int. Cl.
*B60R 11/02*     (2006.01)
*B60R 11/00*     (2006.01)
*B60R 16/037*    (2006.01)

(52) U.S. Cl.
CPC ......... *B60R 11/0235* (2013.01); *B60R 16/037* (2013.01); *B60R 2011/007* (2013.01); *B60R 2011/0017* (2013.01); *B60R 2011/0066* (2013.01); *B60R 2011/0071* (2013.01); *B60R 2011/0089* (2013.01)

(58) Field of Classification Search
None
See application file for complete search history.

(56) References Cited

U.S. PATENT DOCUMENTS

| | | | | |
|---|---|---|---|---|
| 8,462,103 B1* | 6/2013 | Moscovitch | ............ | B60R 11/02 345/1.1 |
| 2004/0032541 A1* | 2/2004 | Rochel | ................ | B60R 11/0235 348/825 |
| 2005/0116943 A1* | 6/2005 | Wohrle | ............... | B60R 11/0235 345/211 |
| 2006/0032996 A1* | 2/2006 | Wu | ........................ | B60N 3/004 248/218.4 |
| 2006/0087163 A1* | 4/2006 | Cilluffo | ............... | B60R 11/0235 297/188.04 |
| 2009/0135363 A1* | 5/2009 | Yeh | ..................... | B60R 11/0235 349/149 |
| 2011/0155873 A1* | 6/2011 | Montag | .................. | B60R 11/02 248/218.4 |

(Continued)

*Primary Examiner* — David R Dunn
*Assistant Examiner* — Christopher E Veraa (57) ABSTRACT

An entertainment bracket for a seat of a motor vehicle includes a mount disposed on the seat, the mount having a headrest bracket and a screen support. The headrest bracket extends from a substantially planar headrest attachment portion rearwards to the screen support, the screen support connected at an angle to the headrest attachment portion and including a first portion of a swivel ball joint. A human machine interface (HMI) bracket supports an HMI and includes a second portion of the swivel ball joint connected to the first portion of the swivel ball joint, the first portion and the second portion of the swivel ball joint allowing the HMI bracket to articulate through a range of motion relative to the headrest bracket. A covering component is disposed overtop the headrest attachment portion and forms a substantially smooth, continuous exterior surface of the entertainment bracket.

16 Claims, 6 Drawing Sheets

(56) References Cited

U.S. PATENT DOCUMENTS

| | | | |
|---|---|---|---|
| 2012/0018471 A1* | 1/2012 | Guillermo | B60R 11/0235 224/275 |
| 2012/0047711 A1* | 3/2012 | Meyer | F16M 13/00 29/525.01 |
| 2012/0125959 A1* | 5/2012 | Kucera | B60R 11/0229 224/275 |
| 2017/0036616 A1* | 2/2017 | Lim | B60R 11/0235 |
| 2017/0174146 A1* | 6/2017 | Kipp | B60N 2/2222 |
| 2017/0225624 A1* | 8/2017 | Fischer | F16M 11/10 |
| 2017/0313260 A1* | 11/2017 | Minn | B60R 11/0235 |
| 2018/0056889 A1* | 3/2018 | Harris | B60R 11/00 |
| 2019/0210541 A1* | 7/2019 | Caltabiano | B60R 11/0235 |
| 2019/0248299 A1* | 8/2019 | Shain | H05K 5/0247 |
| 2019/0291656 A1* | 9/2019 | Chou | B60R 11/0235 |

* cited by examiner

REAR SEAT ENTERTAINMENT BRACKET WITH SWIVEL BALL POSITIONING

The present disclosure relates to motor vehicle seats, and more specifically to mounting systems for entertainment devices for motor vehicle seat assemblies. At least since the advent of the smart phone, customers have expressed continually growing interest in connected devices, and the so-called "internet of things." Manufacturers in a wide variety of areas have begun to recognize this trend and have made steps to integrate connected or connectable devices in a variety of items from kitchen appliances to motor vehicles. In particular, motor vehicle manufacturers have begun to offer entertainment systems for use by occupants of their products. Rear seat passengers have been especially well catered for with a seemingly ever-increasing number of vehicles being offered with entertainment packages including video screens for in connection with on-board electronic storage and audio/visual (A/V) equipment, or with personal devices such as smart phones. Typical rear seat video screens are often supplied in either a fold-down screen extending from a ceiling or roof of the motor vehicle, or the screens have been mounted to the front seat or integrated within the headrest assembly of the front seats. However, integrating video screens within the headrests of the front seats tends to increase the costs of development for the motor vehicle, as the headrests for each vehicle model generally need to be specially adapted to offer versions with screens, and versions without, depending on trim specifications for each vehicle. Additionally, depending on the size of the front seat occupants, the headrests may be positioned at such an angle that rear seat occupants cannot easily and/or comfortably view the screens. Providing screens on a mount, such as a bracket, attached to the front seats may address at least some of the cost, model-adaptation, and positioning concerns discussed above. However, typical bracket assemblies for mounting a screen to the front seat have limited range of adjustment, and therefore, limited viewing angles, and by mounting the screens to a bracket that extends from the front seat, rear seat occupant safety may be affected during motor vehicle crashes or impacts.

Accordingly, there is a need in the art for a rear seat entertainment system bracket that eliminates or at least substantially reduces rear seat occupant safety concerns, while providing a wide variety of adjustability, and that may be mass produced at low cost and fitted or retrofitted to a wide variety of vehicle platforms without requiring the seats or headrests themselves to be customized.

SUMMARY

According to several aspects of the present disclosure, an entertainment bracket for a seat of a motor vehicle includes a mount disposed on the seat, the mount having a headrest bracket and a screen support. The headrest bracket extends from a substantially planar headrest attachment portion rearwards relative to the front of the seat to the screen support, the screen support connected at an angle to the headrest attachment portion and including a first portion of a swivel ball joint. A human machine interface (HMI) bracket supports an HMI, the HMI bracket including a second portion of the swivel ball joint connected to the first portion of the swivel ball joint, the first portion and the second portion of the swivel ball joint allowing the HMI bracket to articulate through a range of motion relative to the headrest bracket. A covering component is disposed overtop the headrest attachment portion and forms a substantially smooth, continuous exterior surface of the entertainment bracket.

In another aspect of the present disclosure the headrest attachment portion includes a plurality of slots shaped and sized to accept and surround a headrest post of a headrest fitted to the seat, and the plurality of slots extends from a forward-facing edge of the headrest attachment portion to a curved terminus disposed slightly before a rearward-facing edge of the headrest attachment portion.

In yet another aspect of the present disclosure at least one of the plurality of slots has a substantially hooked shape extending outwards relative to a centerline of the headrest attachment portion.

In yet another aspect of the present disclosure at least one of the plurality of slots has a substantially angled shape extending outwards relative to a centerline of the headrest attachment portion.

In yet another aspect of the present disclosure at least one of the plurality of slots has a substantially linear shape extending shape extending at an angle outwards and rearwards relative to a centerline of the headrest attachment portion and the forward-facing edge.

In yet another aspect of the present disclosure a bushing is disposed in each of the plurality of slots, the bushing held in place by a clip having first attachment features sized and shaped to fit into receiving features formed in the headrest attachment portion, and second attachment features sized and shaped to engage with the forward-facing edge of the headrest attachment portion.

In yet another aspect of the present disclosure the bushing, the clip, and the plurality of slots engage with the headrest posts of the seat and limit motion of the mount relative to the seat.

In yet another aspect of the present disclosure the headrest bracket further includes a conduit guide, electrical wiring extending from a power source or a data source through the conduit guide and to the HMI, and wherein the HMI is supported on the HMI bracket by a plurality of attachment members comprising: bolts, screws, nuts, magnets, and clips.

In yet another aspect of the present disclosure the first portion of the swivel ball joint further includes a pin, the second portion of the swivel ball joint further includes a channel, and wherein when the first portion and the second portion are interconnected, a range of movement of the first portion relative to the second portion is limited by movement of the pin within the channel.

In yet another aspect of the present disclosure the range of movement of the first portion relative to the second portion is approximately 15° to approximately 90° in a rotational direction, and about 15° to about 20° in a vertical direction and in a horizontal direction.

In yet another aspect of the present disclosure an entertainment bracket for a seat of a motor vehicle includes a mount disposed on the seat, the mount having a headrest bracket and a screen support. The headrest bracket has a conduit guide, electrical wiring extending from a power source or a data source through the conduit guide and to a human-machine interface (HMI), the headrest bracket extending from a substantially planar headrest attachment portion rearwards relative to the front of the seat to the screen support, the headrest attachment portion including a plurality of slots shaped and sized to accept and at least partially surround a headrest post of a headrest fitted to the seat, the plurality of slots extending from a forward-facing edge of the headrest attachment portion to a curved terminus disposed slightly before a rearward-facing edge of the headrest attachment portion, and the screen support connected at an angle to the headrest attachment portion and including a first portion of a swivel ball joint. The entertainment bracket further includes an HMI bracket supporting the HMI, the HMI bracket including a second portion of the swivel ball joint connected to the first portion of the swivel ball joint, the first portion and the second portion of the swivel ball joint allowing the HMI bracket to articulate through a range of motion relative to the headrest bracket. A covering component is disposed overtop the headrest attachment portion and forms a substantially smooth, continuous exterior surface of the entertainment bracket.

In yet another aspect of the present disclosure at least one of the plurality of slots has a substantially hooked shape extending outwards relative to a centerline of the headrest attachment portion.

In yet another aspect of the present disclosure at least one of the plurality of slots has a substantially angled shape extending outwards relative to a centerline of the headrest attachment portion.

In yet another aspect of the present disclosure at least one of the plurality of slots has a substantially linear shape extending shape extending at an angle outwards and rearwards relative to a centerline of the headrest attachment portion and the forward-facing edge.

In yet another aspect of the present disclosure a bushing is disposed in each of the plurality of slots, the bushing held in place by a clip having first attachment features sized and shaped to fit into receiving features formed in the headrest attachment portion, and second attachment features sized and shaped to engage with the forward-facing edge of the headrest attachment portion.

In yet another aspect of the present disclosure the bushing, the clip, and the plurality of slots engage with the headrest posts of the seat and limit motion of the mount relative to the seat.

In yet another aspect of the present disclosure the first portion of the swivel ball joint further includes a pin, the second portion of the swivel ball joint further includes a channel, and wherein when the first portion and the second portion are interconnected, a range of movement of the first portion relative to the second portion is limited by movement of the pin within the channel.

In yet another aspect of the present disclosure the range of movement of the first portion relative to the second portion is approximately 15° to approximately 90° in a rotational direction, and about 15° to about 20° in a vertical direction and in a horizontal direction.

In yet another aspect of the present disclosure the HMI is a mobile device provided by an occupant of the motor vehicle and connected to the HMI bracket by a plurality of attachment members, the attachment members comprising a magnet, or a clip, wherein the HMI is connected to the electrical wiring disposed in the conduit guide.

In yet another aspect of the present disclosure an entertainment bracket for a seat of a motor vehicle includes a mount disposed on the seat, the mount having a headrest bracket and a screen support. The headrest bracket has a conduit guide, electrical wiring extending from a power source or a data source through the conduit guide and to a human-machine interface (HMI), the headrest bracket extending from a substantially planar headrest attachment portion rearwards relative to the front of the seat to the screen support, the headrest attachment portion including a plurality of slots shaped and sized to accept and at least partially surround a headrest post of a headrest fitted to the seat, the plurality of slots extending from a forward-facing edge of the headrest attachment portion to a curved terminus disposed slightly before a rearward-facing edge of the headrest attachment portion, and the screen support connected at an angle to the headrest attachment portion and including a first portion of a swivel ball joint. The entertainment bracket further includes an HMI bracket supporting the HMI, the HMI bracket including a second portion of the swivel ball joint connected to the first portion of the swivel ball joint, the first portion and the second portion of the swivel ball joint allowing the HMI bracket to articulate through a range of motion relative to the headrest bracket. A covering component is disposed overtop the headrest attachment portion and forms a substantially smooth, continuous exterior surface of the entertainment bracket. At least one of the plurality of slots has a shape comprising: a substantially hooked shape extending outwards relative to a centerline of the headrest attachment portion, a substantially angled shape extending outwards relative to a centerline of the headrest attachment portion, or a substantially linear shape extending shape extending at an angle outwards and rearwards relative to a centerline of the headrest attachment portion and the forward-facing edge. A bushing is disposed in each of the plurality of slots, the bushing held in place by a clip having first attachment features sized and shaped to fit into receiving features formed in the headrest attachment portion, and second attachment features sized and shaped to engage with the forward-facing edge of the headrest attachment portion, and the bushing, the clip, and the plurality of slots engage with the headrest posts of the seat and limit motion of the mount relative to the seat. The first portion of the swivel ball joint further includes a pin, the second portion of the swivel ball joint further includes a channel. When the first portion and the second portion are interconnected, a range of movement of the first portion relative to the second portion is limited to approximately 15° to approximately 90° in a rotational direction, and about 15° to about 20° in a vertical direction and in a horizontal direction by movement of the pin within the channel.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Reference will now be made in detail to several embodiments of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity, directional terms such as top, bottom, left, right, up, over, above, below, beneath, rear, and front, may be used with respect to the drawings. Likewise, the terms "forward", "rear", "inner", "inwardly", "outer", "outwardly", "above", and "below" are terms used relative to the orientation of the motor vehicle as shown in the drawings of the present application. Thus, "forward" refers to a direction toward a front of a motor vehicle, "rearward" refers to a direction toward a rear of a motor vehicle, "passenger" refers to a direction towards a passenger side of the motor vehicle (right-hand side in the context of this particular application), "driver" or "driver side" refers to a direction towards the driver's side of the motor vehicle (right-hand side in the context of this particular application), "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle. These and similar directional terms are not to be construed to limit the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing torage compartment particular example embodiments only and is not intended to be limiting. As used herein, the singular forms "a," "an," and "the" may be intended to include the plural forms as well, unless the context clearly indicates otherwise. The terms "comprises", "includes," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "disposed on," "connected to," or "coupled to" another element or layer, it may be directly on, engaged, disposed, connected or coupled to the other element or layer, or intervening elements or layers may be present. In contrast, when an element is referred to as being "directly on," "directly engaged to," "directly disposed on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all storage compartmentations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The following description is merely exemplary in nature and is not intended to limit the present disclosure, application, or uses.

Figure 1:
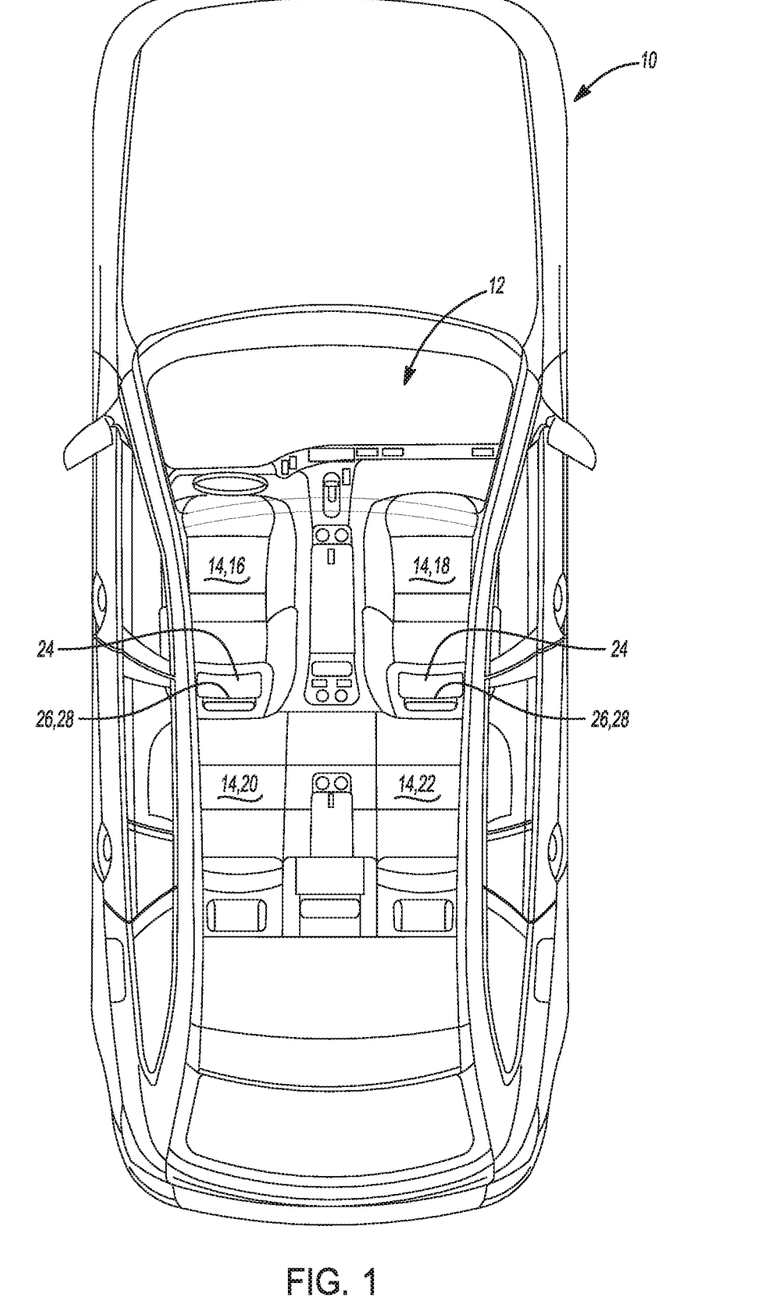
FIG. 1 is an environmental view of a motor vehicle having a rear seat entertainment bracket with swivel ball positioning according to an aspect of the present disclosure.

Referring now to FIG. 1 a motor vehicle is shown and generally indicated by reference number 10. While the motor vehicle is illustrated as a car, it should be appreciated that the motor vehicle 10 may be any type of vehicle including a car, a van, a truck, a bus a motor home, an aircraft, a spacecraft, a water craft, or any other such vehicle without departing from the scope or intent of the present disclosure. The motor vehicle 10 includes a passenger compartment 12 having a plurality of seats 14 including a driver seat 16, a passenger seat 18, a left rear seat 20, and a right rear seat 22.

Figures 2, 3, 4:
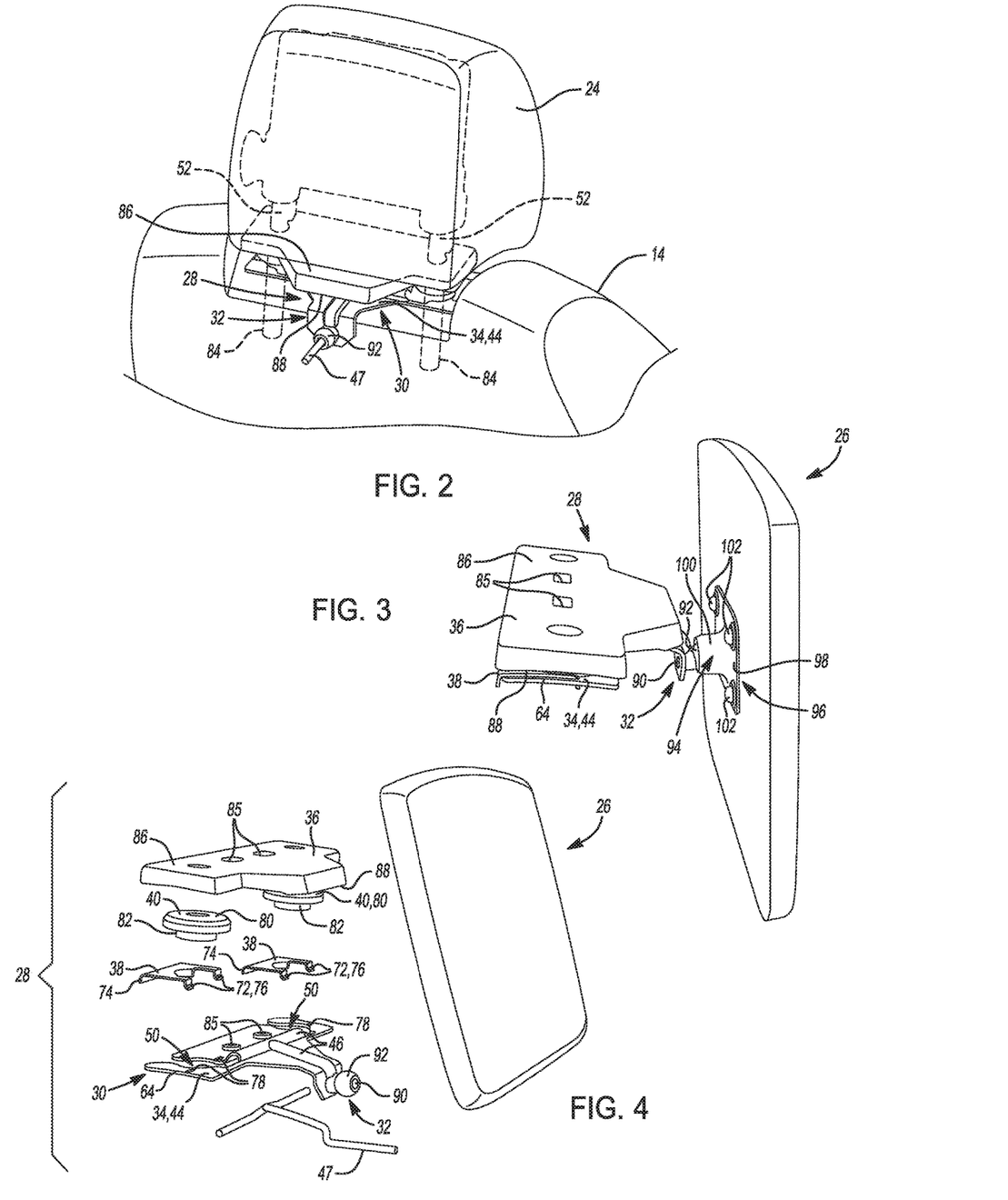
FIG. 2 is a perspective view of a portion of a motor vehicle seat equipped with a rear seat entertainment bracket with swivel ball positioning according to an aspect of the present disclosure.
FIG. 3 is a perspective view of a rear seat entertainment bracket with swivel ball positioning according to an aspect of the present disclosure.
FIG. 4 is a perspective exploded view of a rear seat entertainment bracket with swivel ball positioning according to an aspect of the present disclosure.

Referring to FIGS. 2 and 3 and with continuing reference to FIG. 1, in several aspects, the driver seat 16 and the passenger seat 18 are equipped with headrests 24. The headrests 24 extend upward from each of the seats 14 of the passenger compartment 12 and may be adjustable in height, angle, thickness, and the like, depending on the construction and design requirements of the particular motor vehicle 10. A human-machine interface (HMI) 26 is included in the seats 14 of some examples. In several aspects, the HMI 26 is an electronic input/output or entertainment device such as a display screen, a touchscreen interface, or the like. The HMI 26 of some examples is provided with the motor vehicle 10, while in other examples, the HMI 26 may be an occupant-supplied device such as a smart phone, a tablet, or other such portable devices. The HMI 26 is supported on a rear seat entertainment bracket 28. That is, the rear seat entertainment bracket 28 may support, hold, or at least partially enclose a user-supplied device such as a smart phone, a tablet, a portable computer, or the like without departing from the scope or intent of the present disclosure. The HMI 26 may take any of a wide variety of shapes and sizes depending on the packaging, design, and marketing constraints for a given motor vehicle 10 platform. In some aspects, the HMI 26 may be assembled with the rear seat entertainment bracket 28 and/or the HMI 26 may be disposed within or form a part of the rear seat entertainment bracket 28. Additionally, while the motor vehicle 10 of FIG. 1 has been shown and described as having four seats 14, it should be appreciated that depending on the type of motor vehicle 10, the arrangement of the seats 14 may vary, and the number of seats 14 may therefore vary substantially. For example, a bus may include many more than four seats 14 arranged in rows or the like.

Turning now to FIGS. 3 and 4, and with continuing reference to FIGS. 1 and 2, the rear seat entertainment bracket 28 includes a headrest bracket 30 and a screen support 32. The headrest bracket 30 includes a base plate 34, a covering component 36, a plurality of clips 38, and a plurality of bushings 40. In several aspects, the base plate 34 is made of metals, plastics, composites, or other materials having structural characteristics sufficient to support the HMI 26. The base plate 34 may be formed by any of a variety of different processes including die casting, sand casting, lost foam casting, stamping, 3-D printing, extrusion molding processes, or the like. The base plate 34 has a substantially planar headrest attachment portion 44. The headrest attachment portion 44 is formed with a conduit guide 46. The conduit guide 46 is a channel into which electrical and/or optical conduits, cable, wiring, fibers, or the like 47 are placed during assembly of the rear seat entertainment bracket 28 with the seat 14 and headrest 24.

Accordingly, the precise size and shape of the conduit guide 46 may vary in substantially depending on the construction of the seat 14, the construction of the headrest 24, and the types and locations of various electrical components such as a power source (not shown), a data source (not shown), and the arrangement of the HMI 26 on the rear seat entertainment bracket 28. In one example the conduit guide 46 is T-shaped channel formed in the headrest attachment portion 44, extending substantially to at least one of a plurality of slots 50 formed in the headrest attachment portion 44, and to the screen support 32. However, it should be appreciated that the conduit guide 46 may take any of a variety of different shapes and forms depending on the componentry used in the rear seat entertainment bracket 28, the HMI 26, and the packaging and design constraints of a particular motor vehicle 10 platform without departing from the scope or intent of the present disclosure.

Figures 5A, 5B, 5C, 5D:
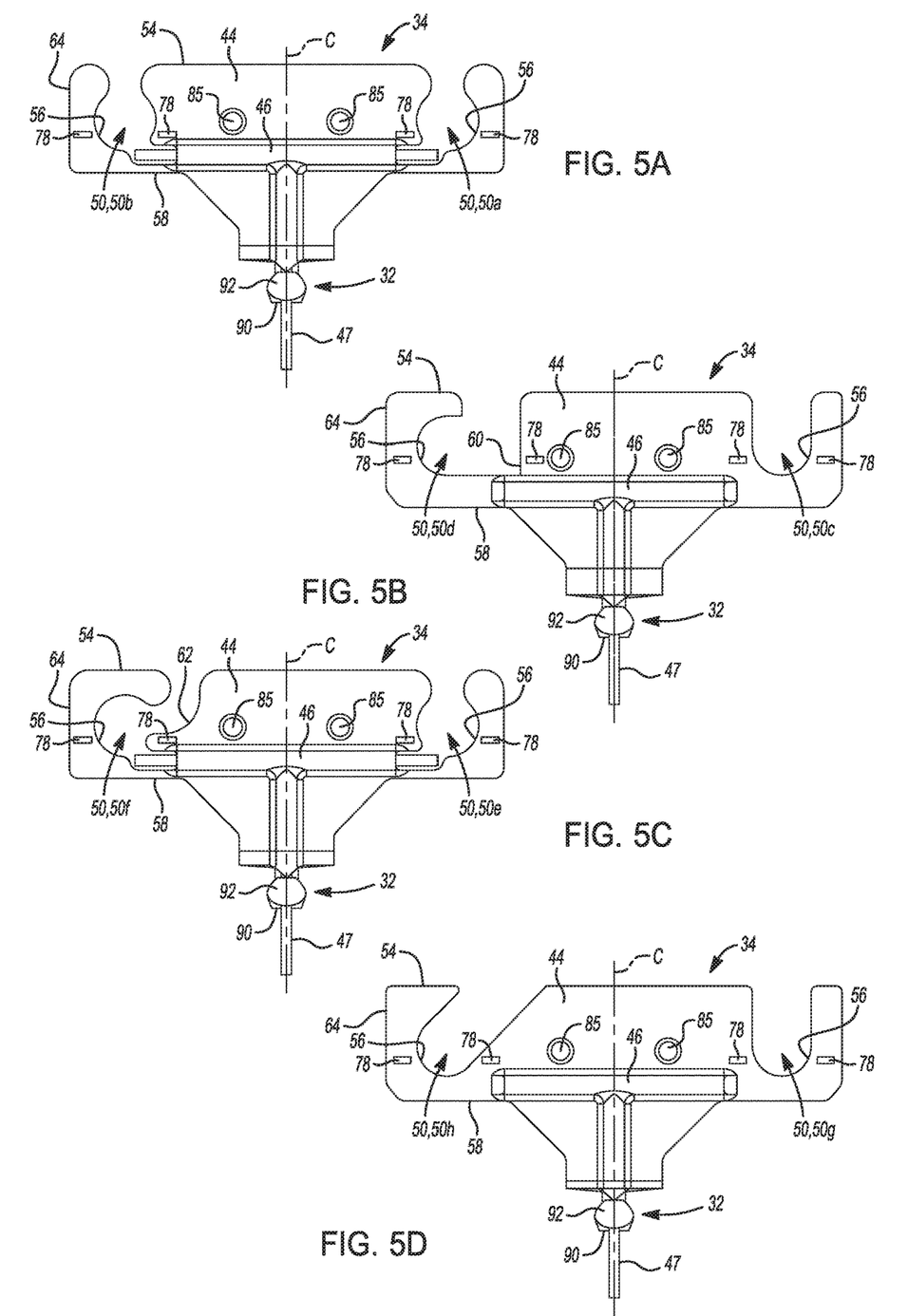
FIG. 5A is a top view of a portion of one example of a rear seat entertainment bracket with swivel ball positioning according to an aspect of the present disclosure.
FIG. 5B is a top view of a portion of a second example of a rear seat entertainment bracket with swivel ball positioning according to an aspect of the present disclosure.
FIG. 5C is a top view of a portion of a third example of a rear seat entertainment bracket with swivel ball positioning according to an aspect of the present disclosure.
FIG. 5D is a top view of a portion of a fourth example of a rear seat entertainment bracket with swivel ball positioning according to an aspect of the present disclosure.

Referring now to FIGS. 5A-5D, the plurality of slots 50 are shaped and sized to accept headrest posts 52 of the driver and/or passenger seats 16, 18. Depending on the application, the slots 50 of a given headrest attachment portion 44 may take a variety of different shapes and sizes. However, in some examples, it is desirable for cost, manufacturing complexity, ease of installation, and the like for the slots 50 of the headrest attachment portion 44 to have a standardized size and shape that can be applied to a wide variety of motor vehicles 10 without substantial modification. In the example of FIG. 5A, the slots 50 extend in a substantially linear fashion from a forward-facing edge 54 towards and having a curved terminus 56 disposed slightly before a rearward-facing edge 58 of the headrest attachment portion 44. In some examples, the slots 50 have a substantially curvilinear shape that approximates an hourglass shape, an elongate pear shape, or the like. Moreover, both a right-hand slot 50A and a left-hand slot 50B are substantially symmetrical both internally, and with respect to each other.

Turning to FIG. 5B, and with continuing reference to FIGS. 1-5A, a second example of the slots 50 of the headrest attachment portion 44 is shown. In the second example, the slots 50 are sized and shaped somewhat differently from each other. In particular, a right-hand slot 50C extends in a substantially linear fashion from the forward-facing edge 54 towards and having a curved terminus 56 slightly before the rearward-facing edge 58 of the headrest attachment portion 44. However, while a left-hand slot 50D extends from the forward-facing edge 54 towards the rearward-facing edge 58, and has a curved terminus 56, the left-hand slot 50D is shaped substantially differently from the right-hand slot 50C. In particular, the left-hand slot 50D begins closer to a centerline "C" of the headrest attachment portion 44 than the right-hand slot 50C. Moreover, the left-hand slot 50D and has an angled bend 60 that directs the headrest post 52 away from the centerline "C". Accordingly, when the headrest attachment portion 44 is assembled with the headrest posts 52, the left-hand slot 50D performs at least two functions. First, the headrest post 52 in the left-hand slot 50D is held in position during assembly so that an installation technician can more easily and effectively install the rear seat entertainment bracket 28. Secondly, once the rear seat entertainment bracket 28 has been fully installed, the shape of the left-hand slot 50D resists movement of the rear seat entertainment bracket 28 that may result from operator manipulations of the HMI 26 and/or in dynamic acceleration or deceleration situations. In other words, the shape of the left-hand slot 50D aids in locating and securing the rear seat entertainment bracket 28 to the seat 14 to which the rear seat entertainment bracket 28 is attached.

Turning now to FIG. 5C, and with continuing reference to FIGS. 1-5B, a third example of the slots 50 of the headrest attachment portion 44 is shown. In the third example, as in the second example, the slots 50 are sized and shaped differently from one another. In particular, the right-hand slot 50E is substantially identical to the right-hand slot 50A, 50C of FIGS. 5A and 5B. However, the left-hand slot 50F has a hook-like shape akin to a question mark or a shepherd's crook. As with the example of FIG. 5B, the hooked left-hand slot 50F begins closer to a centerline "C" of the headrest attachment portion 44 and has a curvilinear bend 62 that directs the headrest post 52 away from the centerline "C". Accordingly, when the headrest attachment portion 44 is assembled with the headrest posts 52, the left-hand slot 50F performs at least two functions. First, the headrest post 52 in the left-hand slot 50F is held in position during assembly so that an installation technician can more easily and effectively install the rear seat entertainment bracket 28. Secondly, once the rear seat entertainment bracket 28 has been fully installed, the shape of the left-hand slot 50F resists movement of the rear seat entertainment bracket 28 that may result from operator manipulations of the HMI 26 and/or in dynamic acceleration or deceleration situations. In other words, the shape of the left-hand slot 50F aids in locating and securing the rear seat entertainment bracket 28 to the seat 14 to which the rear seat entertainment bracket 28 is attached.

Turning now to FIG. 5D, and with continuing reference to FIGS. 1-5C, a fourth example of the slots 50 of the headrest attachment portion 44 is shown. In the fourth example, as in the second and third examples, the slots 50 are sized and shaped differently from one another. In particular, the right-hand slot 50G is substantially identical to the right-hand slots 50A, 50C, 50E of FIGS. 5A-5C. Like the right-hand slot 50G, the left-hand slot 50H extends in a substantially linear fashion from a forward-facing edge 54 towards and having a curved terminus 56 slightly before a rearward-facing edge 58 of the headrest attachment portion 44. However, unlike the right-hand slot 50G, the left-hand slot 50H extends at an angle outward and towards a left-hand side 64 of the headrest attachment portion 44 of the motor vehicle 10 from a position closer to the centerline "C" of the headrest attachment portion 44 than the right-hand slot 50G, and terminates at a position substantially equidistant from the centerline "C" and positioned similarly to the right-hand slot 50G terminus 56. Accordingly, when the headrest attachment portion 44 is assembled with the headrest posts 52, the left-hand slot 50H performs at least two functions. First, the headrest post 52 in the left-hand slot 50H is held in position during assembly so that an installation technician can more easily and effectively install the rear seat entertainment bracket 28. Secondly, once the rear seat entertainment bracket 28 has been fully installed, the shape of the left-hand slot 50H resists movement of the rear seat entertainment bracket 28 that may result from operator manipulations of the HMI 26 and/or in dynamic acceleration or deceleration situations. In other words, the shape of the left-hand slot 50B aids in locating and securing the rear seat entertainment bracket 28 to the seat 14 to which the rear seat entertainment bracket 28 is attached.

While in the examples of FIGS. 5A-5D, the right-hand slot 50A, 50C, 50E, 50G and left-hand slot 50B, 50D, 50F, 50H have been described as having particular shapes, and particular orientations, it should be appreciated that the shapes described are intended only to be representative but non-limiting examples. In addition, it should be understood that the left-hand versus right-hand designations of the slots 50 are simply to assist in understanding of the several drawings, but that the designations are otherwise arbitrary. That is, while the right-hand slots 50A, 50C, 50E, 50G have been described consistently between FIGS. 5A-5D, and the left-hand slots 50B, 50D, 50F, 50H have been described as having various forms, the left-hand and right-hand designations may be reversed without departing from the scope or intent of the present disclosure. Moreover, it should be appreciated that in some examples both the left-hand 50A, 50C, 50E, 50G and right-hand slots 50B, 50D, 50F, 50H may be constructed identically. In other words, both the left-hand 50A, 50C, 50E, 50G and right-hand slots 50B, 50D, 50F, 50H may have substantially linear shapes, angled shapes, hooked, shepherd's crook or question mark shapes, or the like without departing from the scope or intent of the present disclosure.

Turning now to FIGS. 6A-6D, and with continuing reference to FIGS. 1-5D, each of the plurality of clips 38 engages with the headrest attachment portion 44, and when assembled with the headrest attachment portion 44 encloses at least a portion of the orifices 66 defined by the slots 50 to form a substantially circular aperture 68. The clips 38 extend from a plurality of arms 70 having first attachment features 72 to a second attachment feature 74. In several aspects, the first attachment features 72 have a substantially S-shaped bend 76 optimized to engage with receiving features 78 formed in the headrest attachment portion 44. In several aspects, the receiving features 78 are a plurality of apertures formed through the headrest attachment portion 44. The second attachment feature 74 of each of the clips 38 is formed as a hook-like bend or fold optimized to engage with the forward-facing edge 54 of the headrest attachment portion 44.

The bushings 40 are disposed within the substantially circular aperture 68 formed by the assembled headrest attachment portion 44 and clips 38. In several aspects, the bushings 40 substantially cylindrical and formed of a pliable or resilient material such as flexible plastic, rubber, or the like. In other aspects, the bushings 40 are formed of a metal or a relatively hard plastic or polymer, such as polytetrafluoroethelene (PTFE), and optimized to locate the headrest posts 52 within each of the respective seats 14 to which the rear seat entertainment bracket 28 is attached. Each of the bushings 40 is shaped and sized to fit within the slots 50 of the headrest attachment portion 44 and to extend for an axial distance "D" sufficient to extend fully through both the clips 38 and the headrest attachment portion 44. In some examples, the bushings 40 have a cross-sectional profile (not specifically shown) optimized to secure engagement with the headrest attachment portion 44, the clips 38, and the like. That is, the bushings 40 of some examples are substantially cylindrical, while in other examples, the bushings 40 have an expanded head portion 80 and a reduced insertion portion 82. The reduced insertion portion 82 helps to locate the bushings 40 within the headrest attachment portion 44 and the clips 38, while the expanded head portion 80 provides a resilient surface on which the covering component 36 may rest, while also preventing the bushing 40 from simply falling into the seat 14. In some aspects, the bushings 40 extend axially upward from the headrest attachment portion 44 and towards the headrest 24. The bushings 40 are assembled with the headrest attachment portion 44 and inserted into a cavity 84 formed in the seat. Moreover, the clips 38 form an interference fit engagement with the headrest attachment portion 44 and retain and position the bushings 40 within the cavity 84 and against the headrest posts 52.

Figure 6A:
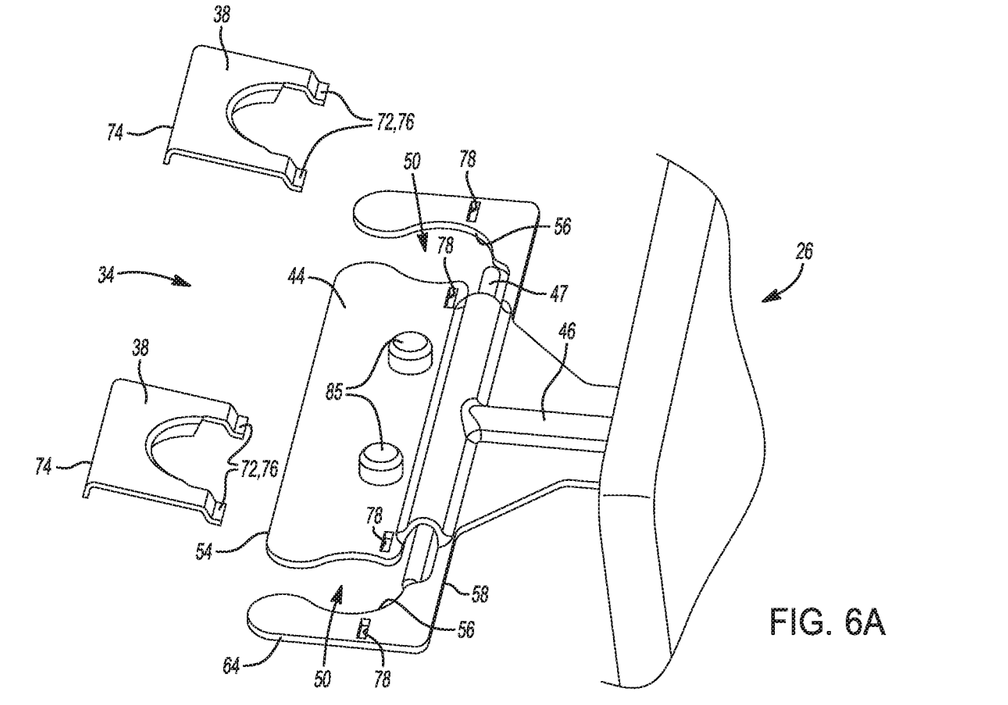
FIG. 6A is a partially exploded perspective top view of a portion of a rear seat entertainment bracket with swivel ball positioning showing attachment features and clips according to an aspect of the present disclosure.
Figure 6B:
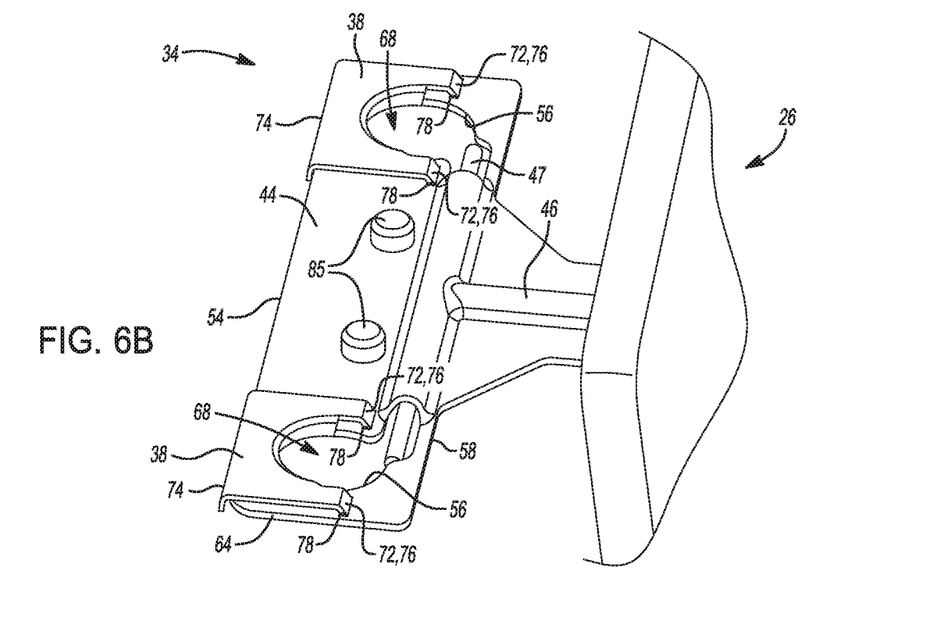
FIG. 6B is a perspective top view of a rear seat entertainment bracket with swivel ball positioning showing clips assembled with attachment features according to an aspect of the present disclosure.
Figure 6C:
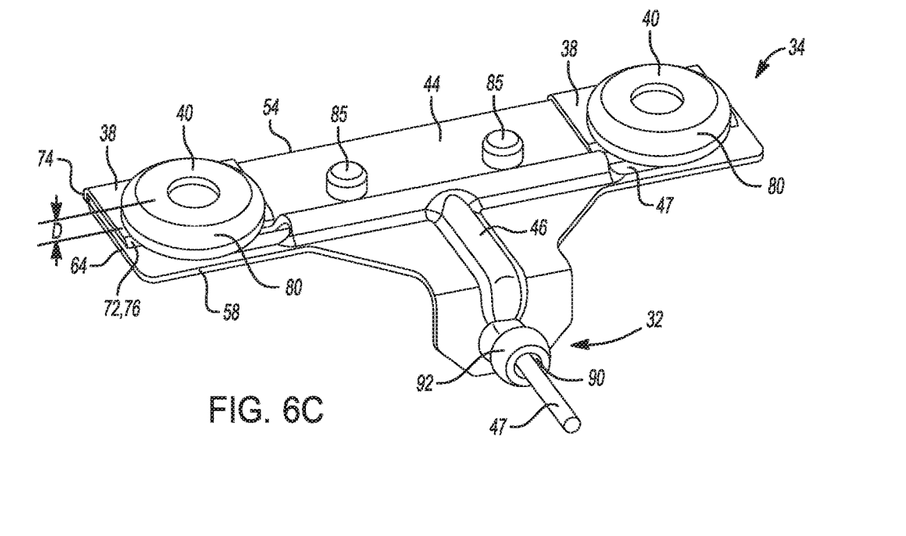
FIG. 6C is a perspective top view of a portion of a rear seat entertainment bracket with swivel ball positioning showing bushings according to an aspect of the present disclosure.
Figure 6D:
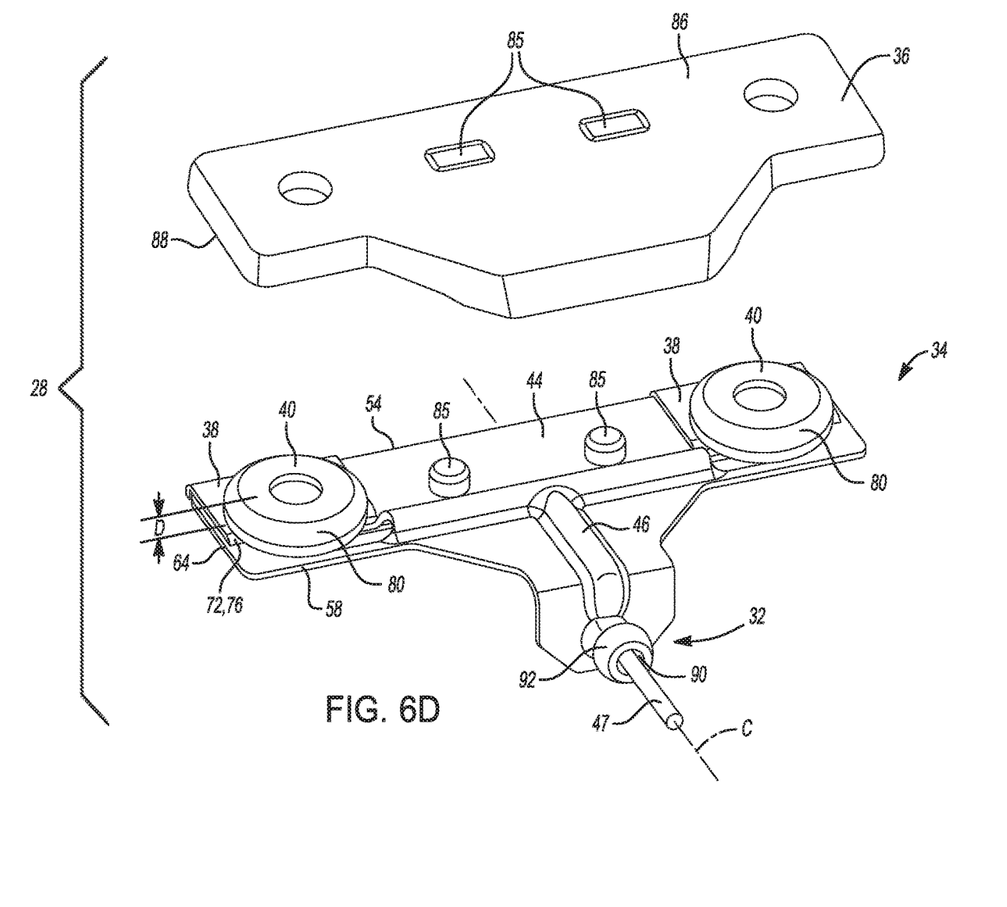
FIG. 6D is a partially exploded perspective top view of a portion of a rear seat entertainment bracket with swivel ball positioning showing an aesthetic cover according to an aspect of the present disclosure.

The covering component 36 is assembled with the headrest attachment portion 44 via a plurality of attachment members 85. The attachment members 85 of some examples are screws, nuts, bolts, rivets, press-fittings, snaps, clips, or other such mechanical fasteners. The attachment members 85 aid in properly locating the covering component 36 on the headrest attachment portion 44 during assembly, and preventing movement of the covering component 36 relative to the headrest attachment portion 44 once the attachment members 85 of each of the covering component 36 and the headrest attachment portion 44 have been engaged or connected to one another.

The covering component 36 forms an aesthetic cover for at least a portion of the headrest bracket 30. In some aspects, the covering component 36 is formed of plastic, metal, composites, or the like and has a substantially continuous, smooth exterior surface 86 and an interior surface 88 having a plurality of interference or snap-fit features (not specifically shown). The interference or snap-fit features of the covering component 36 allow the covering component 36 to be relatively easily snapped or clipped onto or otherwise assembled with the headrest bracket 30. In several aspects, the interference or snap-fit features include a plurality of internally-projecting flanges optimally sized and shaped to snap or clip onto or otherwise be assembled with the forward-facing edge 54, and the rearward-facing edge 58, or the like. In some examples, the covering component 36 is left in a raw or unfinished state such that the plastic, metal, or composite material of the covering component 36 is exposed and visible to occupants of the motor vehicle 10. In other examples, the covering component 36 is painted, anodized, or otherwise colored or covered with a material that is color and/or pattern-matched to other aspects of the passenger compartment 12 and more specifically, the seats 14.

Figure 7A:
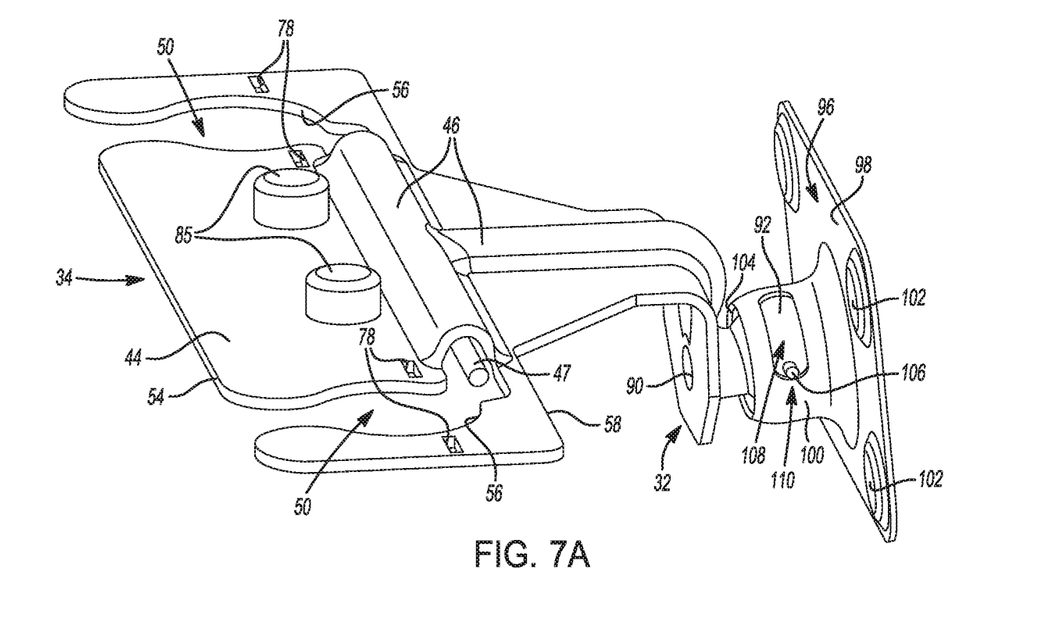
FIG. 7A is a perspective side view of a rear seat entertainment bracket with swivel ball positioning showing a movement limiting feature according to an aspect of the present disclosure.
Figure 7B:
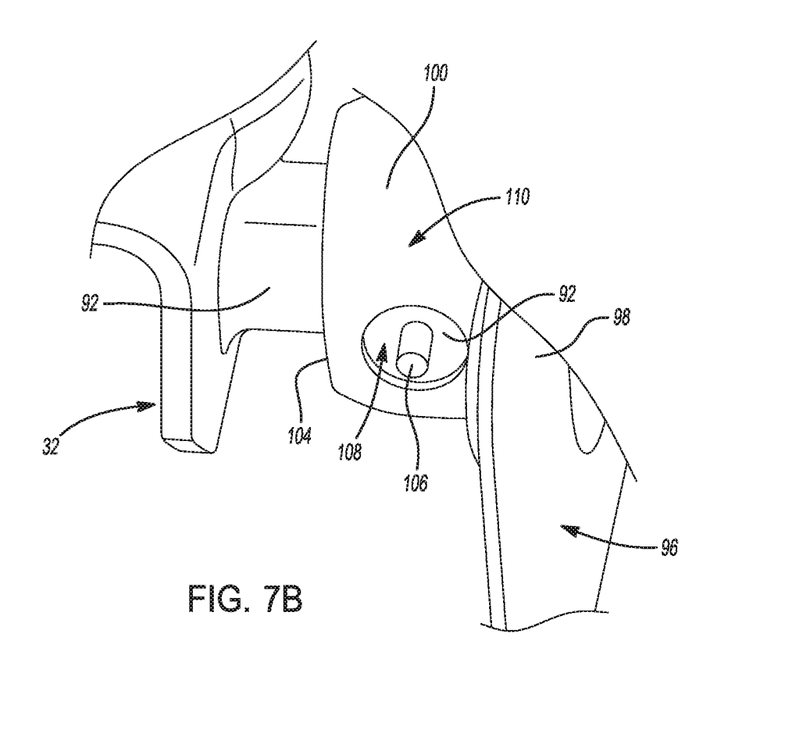
FIG. 7B is a perspective side view of a portion of a rear seat entertainment bracket with swivel ball positioning showing a movement limiting feature according to another aspect of the present disclosure.

Turning now to FIGS. 7A and 7B, and with continuing reference to FIGS. 1-6D, in several aspects the screen support 32 is formed as a flange extending rearward from the headrest attachment portion 44. In some examples, the screen support 32 extends downward or upward at an angle from the substantially planar headrest attachment portion 44. The conduit guide 46 extends into the screen support 32 and ends at an opening 90 formed through a first portion 92 of a swivel ball joint 94 disposed on the screen support 32. The wiring 47 can therefore extend through the conduit guide 46 and through the opening 90 provided in the first portion 92 of the swivel ball joint 94. An HMI bracket 96 includes a substantially planar mounting portion 98 and a second portion 100 of the swivel ball joint 94. The second portion 100 of the swivel ball joint 94 extends substantially perpendicularly in a forward-facing direction relative to the substantially planar mounting portion 98. The mounting portion 98 has attachment features 102 for physically and/or magnetically affixing the mounting portion 98 to the HMI 26. More specifically, the mounting portion 98 is sized and shaped to support the HMI 26. In several aspects, according to the type of HMI 26 used in a given motor vehicle 10 application, the mounting portion 98 may vary substantially in size, shape, structural composition, and the like.

In one example, the mounting portion 98 is formed as a part of the structure of the HMI 26 itself. Accordingly, the mounting portion 98 and the HMI 26 itself are formed or assembled with each other as a unit and installed in the motor vehicle 10 together. In another example, the mounting portion 98 is formed separately from the HMI 26. In the second example, the mounting portion 98 is assembled with the HMI 26 after production of the HMI 26. In an extension of the second example in which the HMI 26 is an operator-provided device, such as a tablet computer, the mounting portion 98 is sized and shaped to secure the tablet computer. In the example of a tablet computer, the mounting portion 98 may be equipped with physical and/or magnetic mounting features such as clips, screws, bolts (not specifically shown), magnets (not specifically shown), or the like. In a further extension of the second example, the mounting portion 98 may also be equipped with an secondary conduit guide (not specifically shown). The secondary conduit guide is sized, shaped, and oriented to place a cable, wire, fiber, or the like 47 so that the cable, wire, fiber, or the like 47 may be inserted into a data or charging port of a user-supplied device. In a specific example, the secondary conduit guide is sized, shaped, and oriented to allow a universal serial bus (USB) cable to be placed proximate a data/charging port of a user-supplied tablet device when the tablet device is attached to the mounting portion 98 by the mounting features.

The swivel ball joint 94 provides a means of articulation for HMI 26 relative to the seat 14 to which the HMI 26 is attached via the rear seat entertainment bracket 28. As mentioned above, the swivel ball joint 94 includes a first portion 92 disposed on the screen support 32 and a second portion 100 extending substantially perpendicularly in a forward-facing direction relative to the substantially planar mounting portion 98. In several aspects, the first portion 92 of the swivel ball joint 94 has a hollow and substantially spherical shape optimally sized and shaped to fit within a joint opening 104 formed in the substantially hemispherically-shaped second portion 100. However, it should be understood that the relative shapes of the first and second portions 92, 100 of the swivel ball joint 94 may be reversed in some examples. That is, the first portion 92 may have a substantially hemispherical shape with a joint opening 104 optimally sized and shaped to accept a hollow and substantially spherically-shaped second portion 100 without departing from the scope or intent of the present disclosure. The first and second portions 92, 100 are assembled with each other via a press-fit, snap-fit, or similar engagement process. Once the first and second portions 92, 100 have been connected and the substantially spherical shape of the first portion 92 is held within the substantially hemispherically-shaped second portion 100, the first and second portions are free to move vertically, horizontally, and rotationally relative to each other. Moreover, the wiring 47 extending through the opening 90 of the first portion 92 also extends into and through the second portion 100, and may thereby be connected to the HMI 26.

While the rear seat entertainment bracket 28 has been described above as having a single swivel ball joint 94, it should be appreciated that a plurality of swivel ball joints 94 may be used to provide movable connections between the headrest bracket 30 to the screen support 32, and more specifically to connect the base plate 34 to the HMI bracket 96 without departing from the scope or intent of the present disclosure. In one example the first portion 92 is formed as described above in relation to the base plate 34. An additional first portion 92 is formed on the HMI bracket 96. Two second portions 100 are shaped as described above, but formed on a swivel link (not specifically shown). The swivel link is a substantially linear rod having second portions 100 of the swivel ball joint 94 formed at each of its ends, thereby forming a dogbone-like link between the first portion 92 of the base plate 34 and the first portion 92 of the HMI bracket 96.

When the rear seat entertainment bracket 28 is assembled with the seat 14, the HMI 26 is mounted to the screen support 32 and the first and second portions 92, 100 of the swivel ball joint 94 are assembled with one another, an occupant can move the HMI 26 through a wide variety of viewing and interaction angles in vertical, horizontal and rotational aspects. Moreover, even when the occupant manipulates the HMI 26 as described above, the swivel ball joint 94 maintains a relative overall position of the HMI 26 relative to the occupant. Thus, the swivel ball joint 94 allows the occupant to adjust viewing angles of the HMI 26 while preventing the HMI 26 from extending substantially rearward towards the occupant and thereby reduces a potential for head injuries for a properly-restrained occupant in the event of a motor vehicle 10 accident. In addition, even if a motor vehicle 10 accident occurs, the swivel ball joint 94 is optimally located relative to the center of gravity (not specifically shown) of the HMI 26 to prevent movement of the HMI 26. That is, because of the location of the swivel ball joint 94 on the mounting portion 98, the HMI 26 disposed on the mounting portion 98 is unlikely to tilt, swivel or otherwise be substantially displaced towards a properly-restrained rear seat occupant during dynamic acceleration or deceleration situations.

In some examples, first portion 92 of the swivel ball joint 94 further includes a pin 106. In some aspects, the pin 106 is formed unitarily with the first portion 92, while in other aspects, the pin 106 is mechanically, chemically, or electromagnetically affixed to the first portion 92 after the first portion 92 and second portion 100 of the swivel ball joint 94 have been assembled together. A channel 108 is formed through the second portion 100 of the swivel ball joint 94. The channel 108 may take any of a variety of different forms depending on the design, packaging, structural, and other such constraints of a given motor vehicle 10 passenger compartment 12. In the example of FIG. 7A, for instance, the channel 108 is formed as a substantially linear slot located proximate to and extending along an equatorial region 110 of the second portion 100. By contrast, the channel 108 of FIG. 7B is a substantially circular orifice formed proximate the equatorial region 110 of the second portion 100. Other such shapes, sizes, locations, and orientations of the channel 108 are intended to fall within the scope of the present disclosure. When the first and second portions 92, 100 are assembled with each other, the pin 106 resides within the channel 108. As the first and second portions 92, 100 of the swivel ball joint 94 are moved relative to one another, the pin 106 and the channel 108 move relative to one another. However, because the pin 106 extends radially beyond the channel 108, movement of the first and second portions 92, 100 relative to one another is limited by the size and shape of the channel 108. Referring once more to FIG. 7A, the channel 108 extends for approximately 90° around the equatorial region 110 of the second portion 100, and for approximately 15°-20° in a direction orthogonal to the equatorial region 110. Accordingly, the first portion 92 can be manipulated in a rotational direction approximately 90° and in a direction orthogonal to the rotational direction (i.e. a vertical or a horizontal tilt of the HMI 26) by approximately 15°-20°. With further reference to FIG. 7B, the substantially circular channel 108 allows the first portion 92 to move approximately 15°-20° in all directions relative to the second portion 100. While in the foregoing examples, the ranges of motion of the first and second portions 92, 100 relative to each other have been described as between about 15° and 20°, or approximately 90°, it should be appreciated that these ranges are merely examples intended to aid in understanding. Thus, depending on the particular motor vehicle 10 platform the channels 108 may extend for substantially more or less than 15°-20°, or 90° without departing from the scope or intent of the present disclosure. In one example, the channels 108 allow ranges of motion of the first and second portions 92, 100 relative to one another of between about 5° to about 270° in a rotational direction, and about 5° to about 45° in the direction orthogonal to the rotational direction (vertical or horizontal tilt of the HMI 26). In another example, the channels 108 allow ranges of motion of the first and second portions 92, 100 relative to one another of up to about 180° in a rotational direction, and up to about 35° in the direction orthogonal to the rotational direction (vertical or horizontal tilt of the HMI 26). Moreover, it should be appreciated that the ranges of motion defined by the channel 108 and the pin 106 need not operate independently of one another. That is, rotational and vertical and/or horizontal movement of the HMI 26 can be accomplished simultaneously without departing from the scope or intent of the present disclosure.

A rear seat entertainment bracket 28 with swivel ball 94 positioning of the present disclosure offers several advantages. These include eliminating or at least substantially reducing rear seat occupant safety concerns, while providing a wide variety of adjustability, and that may be mass produced at low cost and fitted or retrofitted to a wide variety of motor vehicle 10 platforms without requiring the seats 14 or headrests 24 themselves to be customized.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An entertainment bracket for a seat of a motor vehicle comprising:

a mount disposed on the seat, the mount having a headrest bracket and a screen support;

the headrest bracket extending from a substantially planar headrest attachment portion rearwards relative to a front of the seat to the screen support, the screen support connected at an angle to the headrest attachment portion and including a first portion of a swivel ball joint, the first portion of the swivel ball joint formed unitarily with the headrest attachment portion;

a human machine interface (HMI) bracket supporting an HMI, the HMI bracket including a second portion of the swivel ball joint connected to the first portion of the swivel ball joint, the first portion and the second portion of the swivel ball joint allowing the HMI bracket to articulate through a range of motion relative to the headrest bracket; and a covering component disposed overtop the headrest attachment portion and forming a substantially smooth, continuous exterior surface of the entertainment bracket, wherein the headrest attachment portion includes a plurality of slots shaped and sized to accept and surround a headrest post of a headrest fitted to the seat, and wherein the plurality of slots extends from a forward-facing edge of the headrest attachment portion to a curved terminus disposed slightly before a rearward-facing edge of the headrest attachment portion, wherein a bushing is disposed in each of the plurality of slots, the bushing held in place by a clip having first attachment features sized and shaped to fit into receiving features formed through the headrest attachment portion, and second attachment features sized and shaped to extend over, hook onto, and at least partially surround and form an interference fit engagement with the forward-facing edge of the headrest attachment portion, and wherein the headrest bracket further comprises a conduit guide, the conduit guide extending through the first portion and the second portion of the swivel ball joint, electrical wiring extending from a power source or a data source through the conduit guide and to the HMI, and wherein the HMI is supported on the HMI bracket by a plurality of attachment members comprising one or more of: bolts, screws, nuts, magnets, and clips.

2. The entertainment bracket of claim 1 wherein at least one of the plurality of slots has a substantially hooked shape extending outwards relative to a centerline of the headrest attachment portion.

3. The entertainment bracket of claim 1 wherein at least one of the plurality of slots has a substantially angled shape extending outwards relative to a centerline of the headrest attachment portion.

4. The entertainment bracket of claim 1 wherein at least one of the plurality of slots has a substantially linear shape extending shape extending at an angle outwards and rearwards relative to a centerline of the headrest attachment portion and the forward-facing edge.

5. The entertainment bracket of claim 1 wherein the bushing, the clip, and the plurality of slots engage with the headrest posts of the seat and limit motion of the mount relative to the seat.

6. The entertainment bracket of claim 1 wherein the first portion of the swivel ball joint further comprises a pin, the second portion of the swivel ball joint further comprises a channel, and wherein when the first portion and the second portion are interconnected, a range of movement of the first portion relative to the second portion is limited by movement of the pin within the channel.

7. The entertainment bracket of claim 6 wherein the range of movement of the first portion relative to the second portion is approximately 15° to approximately 90° in a rotational direction, and about 15° to about 20° in a vertical direction and in a horizontal direction.

8. An entertainment bracket for a seat of a motor vehicle comprising:
a mount disposed on the seat, the mount having a headrest bracket and a screen support;
the headrest bracket having a conduit guide, the conduit guide extending through a first portion and a second portion of a swivel ball joint, electrical wiring extending from a power source or a data source through the conduit guide and to a human-machine interface (HMI), the headrest bracket extending from a substantially planar headrest attachment portion rearwards relative to a front of the seat to the screen support, the headrest attachment portion including a plurality of slots shaped and sized to accept and at least partially surround a headrest post of a headrest fitted to the seat, the plurality of slots extending from a forward-facing edge of the headrest attachment portion to a curved terminus disposed slightly before a rearward-facing edge of the headrest attachment portion, and the screen support connected at an angle to the headrest attachment portion and including a first portion of a swivel ball joint, the first portion of the swivel ball joint formed unitarily with the headrest attachment portion;
a bushing disposed in each of the plurality of slots, the bushing held in place by a clip having first attachment features sized and shaped to fit into receiving features formed in the headrest attachment portion, and second attachment features sized and shaped to extend over, hook onto, and at least partially surround and form an interference fit engagement with the forward-facing edge of the headrest attachment portion;
an HMI bracket supporting the HMI, the HMI bracket including a second portion of the swivel ball joint connected to the first portion of the swivel ball joint, the first portion and the second portion of the swivel ball joint allowing the HMI bracket to articulate through a range of motion relative to the headrest bracket; and
a covering component disposed overtop the headrest attachment portion and forming a substantially smooth, continuous exterior surface of the entertainment bracket.

9. The entertainment bracket of claim 8 wherein at least one of the plurality of slots comprises a substantially hooked shape extending outwards relative to a centerline of the headrest attachment portion.

10. The entertainment bracket of claim 8 wherein at least one of the plurality of slots comprises a substantially angled shape extending outwards relative to a centerline of the headrest attachment portion.

11. The entertainment bracket of claim 8 wherein at least one of the plurality of slots comprises a substantially linear shape extending shape extending at an angle outwards and rearwards relative to a centerline of the headrest attachment portion and the forward-facing edge.

12. The entertainment bracket of claim 8 wherein the bushing, the clip, and the plurality of slots engage with the headrest posts of the seat and limit motion of the mount relative to the seat.

13. The entertainment bracket of claim 8 wherein the first portion of the swivel ball joint further comprises a pin, the second portion of the swivel ball joint further comprises a channel, and wherein when the first portion and the second portion are interconnected, a range of movement of the first portion relative to the second portion is limited by movement of the pin within the channel.

14. The entertainment bracket of claim 13 wherein the range of movement of the first portion relative to the second portion is approximately 15° to approximately 90° in a rotational direction, and about 15° to about 20° in a vertical direction and in a horizontal direction.

15. The entertainment bracket of claim 8 wherein the HMI is a mobile device provided by an occupant of the motor vehicle and connected to the HMI bracket by a plurality of attachment members, the attachment members comprising a magnet, or a clip, wherein the HMI is connected to the electrical wiring disposed in the conduit guide.

16. An entertainment bracket for a seat of a motor vehicle comprising:
a mount disposed on the seat, the mount having a headrest bracket and a screen support;
the headrest bracket having a conduit guide, electrical wiring extending from a power source or a data source through the conduit guide and to a human-machine interface (HMI), the headrest bracket extending from a substantially planar headrest attachment portion rearwards relative to a front of the seat to the screen support, the headrest attachment portion including a plurality of slots shaped and sized to accept and at least partially surround a headrest post of a headrest fitted to the seat, the plurality of slots extending from a forward-facing edge of the headrest attachment portion to a curved terminus disposed slightly before a rearward-facing edge of the headrest attachment portion, and the screen support connected at an angle to the headrest attachment portion and including a first portion of a swivel ball joint, the first portion of the swivel ball joint formed unitarily with the headrest attachment portion;

an HMI bracket supporting the HMI, the HMI bracket including a second portion of the swivel ball joint connected to the first portion of the swivel ball joint, the first portion and the second portion of the swivel ball joint allowing the HMI bracket to articulate through a range of motion relative to the headrest bracket; and a covering component disposed overtop the headrest attachment portion and forming a substantially smooth, continuous exterior surface of the entertainment bracket, wherein at least one of the plurality of slots has a shape comprising: a substantially hooked shape extending outwards relative to a centerline of the headrest attachment portion, a substantially angled shape extending outwards relative to a centerline of the headrest attachment portion, or a substantially linear shape extending shape extending at an angle outwards and rearwards relative to a centerline of the headrest attachment portion and the forward-facing edge, and wherein a bushing is disposed in each of the plurality of slots, the bushing held in place by a clip having first attachment features sized and shaped to fit into receiving features formed in the headrest attachment portion, and second attachment features sized and shaped to extend over, hook onto, and at least partially surround and form an interference fit engagement with the forward-facing edge of the headrest attachment portion, and the bushing, the clip, and the plurality of slots engage with the headrest posts of the seat and limit motion of the mount relative to the seat, wherein the conduit guide extends through the first portion and the second portion of the swivel ball joint, wherein the first portion of the swivel ball joint further comprises a pin, the second portion of the swivel ball joint further comprises a channel, and wherein when the first portion and the second portion are interconnected, a range of movement of the first portion relative to the second portion is limited to approximately 15° to approximately 90° in a rotational direction, and about 15° to about 20° in a vertical direction and in a horizontal direction by movement of the pin within the channel.

\* \* \* \* \*